United States Patent [19]

Breger

[11] Patent Number: 4,869,587

[45] Date of Patent: Sep. 26, 1989

[54] PRESBYOPIC CONTACT LENS

[76] Inventor: Joseph L. Breger, 511 Ravine Dr., Highland Park, Ill. 60035

[21] Appl. No.: 133,326

[22] Filed: Dec. 16, 1987

[51] Int. Cl.$^4$ .................................................. G02C 7/04
[52] U.S. Cl. .................................................... 351/161
[58] Field of Search ............... 351/160 R, 160 H, 161, 351/162

[56] References Cited

U.S. PATENT DOCUMENTS

| | | | |
|---|---|---|---|
| 2,544,246 | 3/1951 | Butterfield | 351/160 R |
| 3,037,425 | 6/1962 | De Carle | 351/161 |
| 3,726,587 | 4/1973 | Kendall | 351/161 |
| 4,199,231 | 4/1980 | Evans | 351/160 H |
| 4,636,049 | 1/1987 | Blaker | 351/161 |
| 4,752,123 | 6/1988 | Blaker | 351/161 |

OTHER PUBLICATIONS

Mandell, R. B., *Contact Lens Practice; Hard and Flexible Lenses;* Charles C. Thomas; Springfield, Ill., pp. 649–679 (2nd Edition).

Kendell, C. A.; "Ultrafocal Bifocal Contact Lens"; *Contacto;* Jan. 1976, pp. 31–35.

Bronstein, L.; "Reverse Centrad Bifocal Contact Lenses"; *The Optometric Weekly;* Jun. 20, 1968, pp. 45–48.

Breger, J. L.; "New Design Elements for a Gas-Permeable Bifocal"; *Contacto;* Jul. 1983; pp. 31–32.

Advertisement: University Optical Products Co., Alges (Hefilcon A) Bifocal Contact Lenses, copyright 1986.

*Primary Examiner*—Scott J. Sugarman
*Attorney, Agent, or Firm*—Fitch, Even, Tabin & Flannery

[57] ABSTRACT

Disclosed is a multifocal contact lens of the concentric simultaneous vision type. A bifocal embodiment of the lens includes a central, near portion and an outer surrounding, distant portion. The lens body has a circular outer periphery and the near and distant portions are concentrically arranged on the lens body. The lens includes a prism ballast weighting at a lower edge and has a posterior curve fitted to the wearer's eye so that the lens is low-riding. The center of the near portion of the lens is offset below the center of the wearer's pupil leaving a crescent-shaped portion of the pupil covered by the distant rather than the near portion of the lens. In another embodiment, the lens is provided with a central distant portion of reduced size which, when downwardly offset with respect to the wearer's pupil, overlies a generally ovoid portion thereof. A trifocal embodiment of the lens includes a central portion having a first optical prescription, an outer annular portion having a second optical prescription, and an intermediate annular portion having an intermediate optical prescription. The central portion may provide either near or distant power correction, with the outer portion providing distant or near power correction, respectively. The central, outer and intermediate portions are preferably formed of the same material homogeneous throughout the lens body. Also disclosed is an outer annular fitting portion having a diameter of size approximately equal to that of the wearer's cornea for maintaining the inner concentric, optical correction portions of the lens with respect to the wearer's pupil.

23 Claims, 2 Drawing Sheets

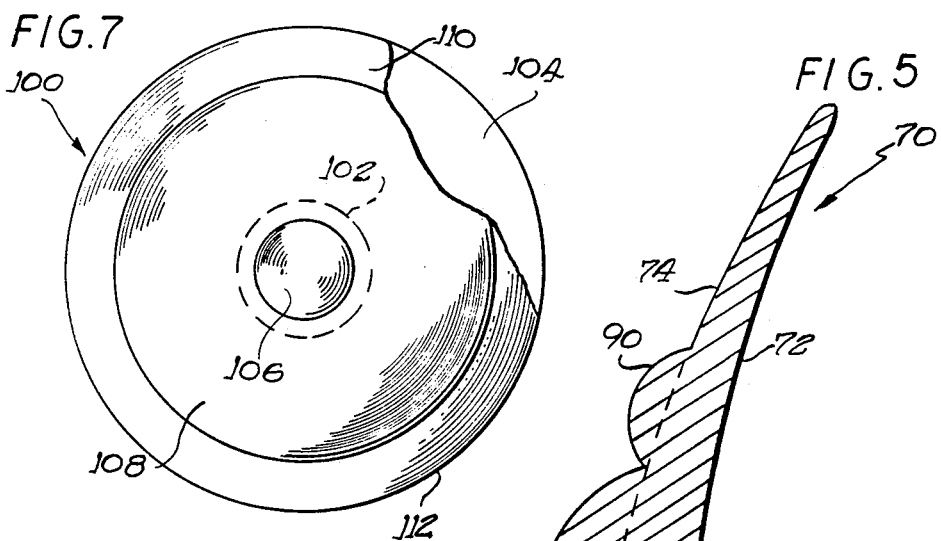
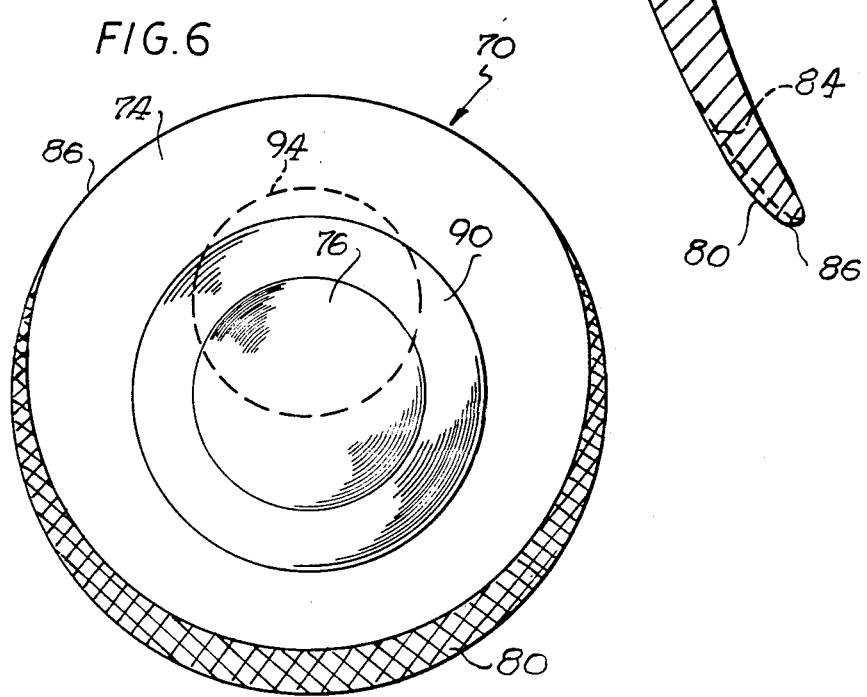

PRESBYOPIC CONTACT LENS

BACKGROUND OF THE INVENTION

1. Field of the Invention

The present invention pertains to contact lenses, and more particularly to lenses used in the treatment of presbyopic patients.

2. Brief Description of the Prior Art

Contact lenses are now widely used for the correction of many different types of vision deficiencies requiring simpler lens designs and less complicated fitting practices. Contact lenses have also been proposed for more demanding applications, and are now widely used for the correction of many types of vision impairments, including presbyopia, which is of interest here.

Contact lens practitioners generally agree that the most desirable form of correction for the majority of presbyopic patients is a bifocal contact lens which successfully provides correction for both near and distance vision, with minimum fitting problems and minimum chair time. The fitting of presbyopic contact lenses has become a specialized field, requiring special fitting techniques and highly developed skills not required in other types of contact lens practice. Despite various improvements, the fitting of presbyopic contact lenses still requires a disproportionately greater amount of chair time, which adds to the cost and inconvenience associated with treatment.

Several different theories of correction for presbyopic patients have been proposed, each generally associated with different lens design features. The contact lens designer has many variables which can be combined to produce a wide variety of vision corrections. Several of the more prominent variables include centering the lens on the patient's cornea or pupil (central fit), or positioning the lens off-center with respect to the wearer's eye; shifting the near and distant portions of a lens about the wearer's eye in response to a change in the wearer's gaze (alternating vision fit) or fixing the lens at a relatively constant position about the wearer's eye (simultaneous vision fit); adjusting the relative size of the near and distant portions of the lens; and placing either the near or the distant portion of the lens at the center of the wearer's eye. Different theories of correction require a carefully controlled combination of the above variables as well as other design variables not mentioned herein. Considerable skill and experience is required to provide a successful bifocal contact lens design which provides successful vision correction for presbyopic patients, is comfortable to the wearer, and requires a minimum of chair time to fit the lens to meet the specific needs of a particular patient.

One example of a contact lens positioned off-center with respect to the wearer's eye is given in U.S Pat. No. 3,726,587, in which a truncated lens having a prism ballast is provided with an offset bifocal segment for viewing near objects. Due to the additional thickness and weight of the truncated lens and prism ballast, the lens is used only when necessary to correct for astigmatism. Accordingly, the use of the lens is considerably limited. The central portion of the lens for viewing near objects has a size of 0.10 to 0.30 mm less than the near-point pupil size of the wearer's eye. Use of the lens is further limited to patients requiring near and distant correction which is closely related (i.e., within 3X), so that optical jump and fuzziness are avoided.

An area of significant improvement in contact lenses long sought in the art is the reduction of chair time required to fit lenses to presbyopic patients. A major factor in the amount of chair time required for fitting the lens to a patient with presbyopia is the precise alignment that must be maintained between the two focal areas of the lens and the patient's pupil, throughout a wide range of movement of the patient's eye, limbal area and eyelid. Typically, relatively closefitting lenses are employed to maintain a stable position. However, patient discomfort is increased with tighter-fitting lenses, and recent studies have indicated problems of inadequate circulation and cleansing of tears associated with tighter-fitting lenses. Further, these problems are at times aggravated when precautions are taken to limit rotation of a contact lens about a wearer's eye.

Summary of the Invention

Accordingly, it is an object of the present invention to provide a concentric bifocal contact lens for correcting presbyopia.

Another object of the present invention is to provide a concentric bifocal contact lens which requires less chair time and provides other economies associated with fitting the lens to a particular patient.

Another object of the present invention is to provide a concentric bifocal contact lens of the above-described type which is economically fabricated using known techniques.

Still another object of the present invention is to provide a bifocal contact lens which is relatively insensitive to exact size of pupil and lateral movement of the contact lens, while being easy to align with the wearer's cornea.

These and other objects of the present invention, which will become apparent from studying the appending description and drawings are provided in a first embodiment wherein a bifocal contact lens is comprised of a lens body having an outer portion with a first corrective optical prescription for viewing distant objects, and an inner, concentric near portion having a second, corrective optical prescription for viewing near objects and having a size substantially larger than the size of a wearer's pupil. The lens body is fitted to the eye of a wearer with means for orienting the lens body with respect to the pupil of the wearer's eye, so that no more than 90% of the inner, near portion covers the pupil of the wearer's eye. In this embodiment, the outer, distant prescription portion overlies a generally crescent-shaped portion of the wearer's pupil.

In a second embodiment of the lens according to the present invention, the relative positions of the near and distant optical correction portions of the lens are reversed, with the inner concentric portion having a corrective prescription for viewing distant objects. The central distant corrective portion covers a generally ovoid configured portion of the wearer's pupil. The size of the ovoid portion covered by the distant correction portion of the lens is determined so that no more than 90% of the outer, near correction portion covers the wearer's pupil.

In a third embodiment of the lens according to the present invention, a trifocal contact lens comprises a lens body having an outer portion with a first optical correction, an inner central portion having a second different optical correction, and an intermediate portion having a third optical correction which is intermediate that of the first and second portions. The trifocal contact lens has means for orienting the optical correction portions of the lens relative to the wearer's pupil so that images from the outer, intermediate and central lens portions have a preselected size and are simultaneously focused by the wearer's eye.

In a fourth embodiment of a contact lens constructed according to principles of the present invention, a multifocal contact lens has a central portion with a first optical correction, and at least one annular concentric portion having a second, different optical correction. A third, outermost annular fitting portion overlies the wearer's cornea and has a diameter generally corresponding to the diameter of the wearer's cornea so as to cover the substantial entirety thereof, so as to contact portions of the wearer's eye surrounding the cornea to orient the central and the annular concentric portion in a preselected relation to the pupil of the wearer's eye, so that images of preselected size are simultaneously focused thereby in the wearer's eye.

Other objects and advantages are attained by the present invention in a trifocal contact lens comprising a lens body having an outer portion with a first optical correction, and inner central portion having a second, different optical correction, and an intermediate portion having a third optical correction intermediate that of the first and second portions, so that images from the outer, intermediate and central lens portions are simultaneously focused by the wearer's eye.

Other aspects and advantages of the present invention are provided in a multifocal contact lens having novel means for orienting the position of optical prescription portions of the lens to the pupil of the wearer's eye. The multifocal contact lens comprises a lens body having at least two concentric optical correction portions and an outer, annular fitting portion overlying the wearer's cornea and including a generally circular peripheral edge. The lens body has a size dimensioned to cover the substantial entirety of the wearer's cornea for contacting portions of the wearer's eyes surrounding the cornea, to orient the optical correction portions of the lens body in a preselected relation to the pupil of the wearer's eye so that images from the optical correction portions of the lens are simultaneously focused by the wearer's eye.

Brief Description of the Drawings

In the drawings, wherein like elements are referenced alike,

FIG. 5 is a side elevational view taken in cross section of another alternative embodiment of a contact lens constructed according to principles of the present invention;

FIG. 6 is a front elevational view of the lens of FIG. 5 showing the recommended fitting thereof with respect to a wearer's pupil; and FIG. 7 is a front elevational view of another alternative of a contact lens according to principles of the present invention.

Detailed Description of the Preferred Embodiments

Figure 1:
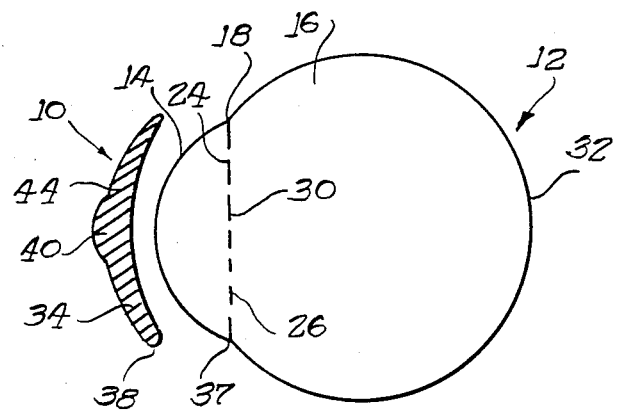
FIG. 1 is a side elevational view taken in cross-section of a contact lens illustrating aspects of the present invention, shown fitted to a wearer's eye, with the spacing between the contact lens and the surface of the wearer's eye being exaggerated for purposes of clarity.

Referring now to the drawings, FIG. 1 illustrates in schematic form, a contact lens fitted to a human eye, generally indicated at 12. The eye includes a cornea 14 and a sclera 16 joined by a limbal area 18. Light transmitted through pupil 30 into the eye is focused onto the retina 32. The contact lens 10 of FIG. 1 is illustrated with an exaggerated thickness and curvature for purposes of clarity. The lens is shown in a generally normal condition, with the wearer focusing on a distant object. The orientation or position of the lower region of the contact lens with respect to the wearer's eye, as will be seen, is maintained in part, by contact with the wearer's inferior or lower eyelid 36 (see FIG. 2) or limbal area 37 (see FIG. 1). The lower region of the lens is preferably thickened for this purpose with a prism ballast.

Figure 2:
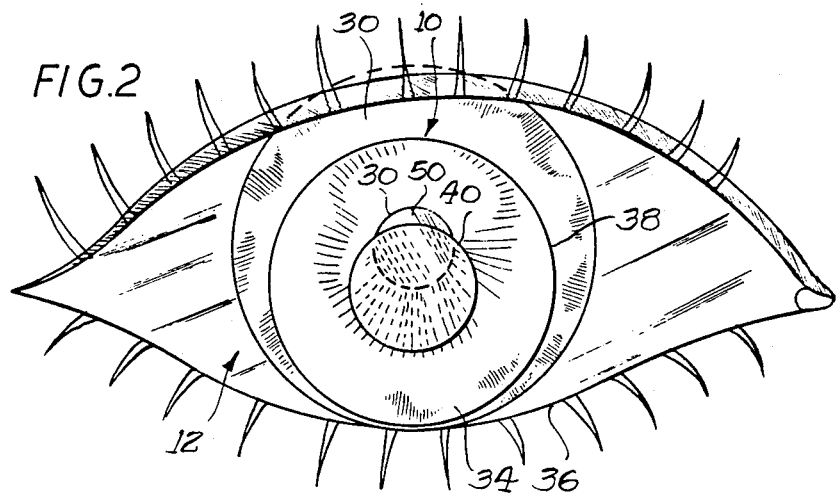
FIG. 2 is a front elevational view corresponding to FIG. 1, but showing the wearer's eye and eyelids in more complete detail.
Figure 3:
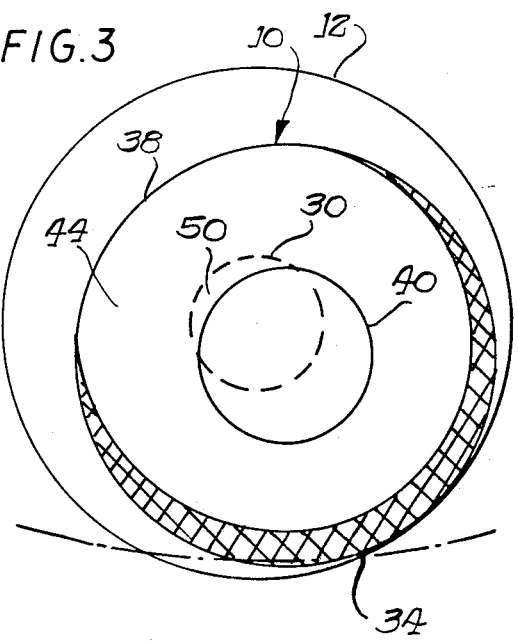
FIG. 3 is a schematic view of the contact lens of FIG. 3 in a rotationally displaced position.

Referring now to FIGS. 2 and 3, it can be clearly seen that the contact lens 10 is completely circular and preferably fitted for what is commonly referred to as a "low-riding" position, that is, a position wherein the lens is shifted downwardly, below a point where it would be centered about the wearer's pupil. Any of the several techniques practiced today can be used to produce the required low-riding position of the contact lens. Referring now to FIG. 1, a prism ballast portion 34 of contact lens 10 is centered at the lower portion thereof to aid in maintaining the lens 10 at a preselected position or orientation with respect to the wearer's eye, for reasons which will become apparent herein. The prism ballast portion 34 is indicated in FIG. 3 by crosshatching. The major mass portion of the prism-ballast portion 34 of lens 10 is located at the lower outer edge of the lens. The prism ballast portion gradually tapers in thickness and anterior surface area toward the upper portion of the lens. The outer edge of lens 10 is preferably smooth and continuously circular, uninterrupted by truncation or the like.

Contact lens 10 is of the concentric vision type, providing bifocal correction for presbyopic patients, where images in different vision correction portions of the lens are simultaneously focused in the patient's eye. The contact lens of the preferred embodiment is constructed to have two concentric areas of vision correction. According to one aspect of the present invention, a central area 40 of the lens illustrated in FIG. 1 is configured to provide near power correction, bringing near-vision objects into focus. The near power area illustrated in FIG. 1 is shown in a lens of homogeneous material, located on the anterior surface of the lens. The near power portion of the lens could also be located on the anterior surface of the lens, or could be provided as a second lens material located at the interior of the lens. The remaining outer annulus 44 of contact lens 10 illustrated in FIG. 1 is configured to provide distant power correction for bringing distant objects into focus on the wearer's retina. A small peripheral curve or fitting portion (not shown) is provided at the outermost portion of annulus 44. The near and distant portions of the lens continuously focus simultaneous images in the wearer's eye. As will be seen, the near and distant portions of the lens can be reversed from the illustrated configuration, and can be arranged to accommodate an intermediate annulus configured to provide a third, intermediate power correction. According to certain aspects of the present invention, the generally continuous circular outer periphery 38 of any of these lenses, the relative proportion between concentric near power and distant power areas (as well as intermediate power when provided), and their controlled, well-maintained off-center location with respect to the wearer's pupil, provide an improved simultaneous vision correction for presbyopic patients, having numerous advantages over conventional bifocal contact lenses.

The arrangement indicated in FIGS. 2 and 3 represents one embodiment of a contact lens 10, according to the present invention, fitted for a wearer having a 3 mm pupil size. The contact lens has a central near power area 40 which is 4 mm in diameter, centered about an outer distance power area 44 which is 10 mm in diameter. As indicated, the near power and distant power areas are concentrically arranged with respect to each other, to provide manufacturing advantages. As can readily be seen in FIG. 2, for example, if the contact lens 10 were to be centered about the wearer's pupil, the 3 mm diameter pupil would be entirely covered by the 4 mm diameter near power area of the lens, with the simultaneous vision correction thereby rendered ineffective. It is essential for contact lenses of this type, and particularly the "oversized" near power area thereof, be non-concentrically oriented with respect to the wearer's pupil so as to provide simultaneous (substantially non-shifting) bifocal vision correction. As will be seen herein, the lowered, non-centering position of the contact lens is well-controlled and maintained so as to continuously provide an optimum ratio of near power/distant power areas viewed by the wearer's pupil. The posterior lens curvature accordingly need not provide a tight fit (a fitting practice which requires frequent readjustment to ease patient discomfort), nor must the posterior curvature be precisely controlled for fitting purposes, since the curvature preferably is not relied upon to provide an attachment to the eye which resists movement.

In the preferred embodiment, maintaining the orientation of contact lens 10 relative to the wearer's eye is accomplished by a prism ballast 34, the thicker portion being at the lower end of the lens in cooperation with the wearer's eyelid or with the junction 37 of the cornea and the limbal region (see FIG. 1). Typically, prism ballasts have heretofore been used to prevent or reduce rotation of a contact lens about the axis thereof. In contrast, the principal function of the prism ballast as used herein for simultaneous vision, is to provide a downward, off-center orientation and a larger surface area for contacting either the wearer's lower eyelid or the wearer's limbal-cornea area so as to maintain the contact lens at a fixed orientation or position relative to the wearer's eye. Thus, although the prism ballast 34 is illustrated in FIGS. 2 and 3 as contacting the wearer's inferior eyelid, it should be understood that the present invention also contemplates contact of the outer periphery (or lens edge) 38 and particularly the prism ballast portion 34 thereof with the wearer's limbal area. The prism ballast has been found to provide a stable orientation of the outer lens relative to the wearer's pupil over prolonged periods of wearing time and despite various types of lens movement, which will now be described.

Alternative embodiments of the contact lens are also contemplated by the present invention. For example, the central near portion 40 can be configured to have a diameter less than the diameter of the pupil 30. With adjustment in size of the outer optical portion 34 and/or the peripheral curve at the outer periphery of the lens, the central optical portion of lens 10 can either be oriented with respect to the pupil or can be downwardly shifted with respect to a centered position. In either of these alternatives, the desired ratios between the central and outer optical portions can be maintained. Specific recommendations for these percentages are given below.

Although prior contact lenses have been designed for movement which was thought necessary to allow a circulation and flushing of tear fluid and debris behind the contact lens, the amount of movement required is greatly reduced with gas-permeable materials recently made available, such as materials made from a combination of a silicone and PMMA. Since some movement (not including gross shifting movement as in alternating vision lenses) of the lens about the eye is to be expected during the normal course of a wearing session, prism ballast 34 is also useful in stabilizing the contact lens 10 with respect to rotated positions, such as that illustrated in FIG. 1, although this is generally not of primary concern for the preferred lenses of the present invention, since they are inherently insensitive to rotation about its own axis, being advantageously configured as a concentric simultaneous vision lenses.

In addition to rotational movement, another common dislocation of the contact lens occurs during blinking. Excursion of the contact lens during a blink is initially in a downward direction as the superior, or upper, lid contacts and travels across the anterior surface of the lens. As the superior eyelid is raised, frictional engagement with the anterior surface of the contact lens continues, thereby pulling the lens in an upward direction to follow the movement of the superior eyelid. Shortly after the superior eyelid reaches its upper or opened position, the contact lens begins to drop from the lid, freely falling to its rest position. When following the principles of the present invention, the correct orientation for simultaneous vision correction will be interrupted only very briefly as lens 10 falls to its rest position indicated in FIGS. 1-3. A steepened posterior curve and the weighting of the ballast portion, for example, aids in a rapid recovery, and resists upward movement.

It is also possible that excursion of the contact lens may be accompanied by either lateral or arcuate rotational travel, potentially causing a misorientation of the contact lens for a prolonged period of time, i.e., longer than the time associated with the occurrence of a blink. However, an important feature of the present invention is that the contact lens is not only insensitive to rotation about its own axis, but also offers improved resistance and tolerance to lateral dislocations, a feature due in part to the low-riding fit of the contact lens, the relative proportion and location of the near power area relative to the wearer's pupil, and contact of the circular periphery of the lens with the wearer's eyelid and/or limbal area. With reference to FIG. 3, it can be seen that the contact lens 10 is shifted laterally toward one side of the wearer's eye. As indicated in FIG. 3, the lens 10 has also experienced rotation about its own central axis. However, due to the concentric construction of the near area portion, rotation of the lens about its own axis has negligible, if any, effect upon the wearer's vision, and the pupil is still covered by roughly the same size crescent portion of the outer, distant portion, thus maintaining very consistent control over the near and distant images simultaneously presented to the wearer's eye.

According to one aspect of the present invention, the prism-ballast portion of the lens is provided principally to maintain the lens body at a preselected position with respect to the wearer's eye, preferably where the concentric central portion maintains a low-riding position on the wearer's eye. The prism ballast portion can be employed to alter the center of mass of the lens or can be arranged to maintain contact with the wearer's inferior eyelid or limbus, but in either event is not relied upon to prevent rotation of the lens about its own axis. Accordingly, this represents a new use of prism-ballast constructions which is directed to simultaneous vision presbyopic or multifocal contact lenses, and especially to such lenses of the concentric type. As pointed about above, due to the generally concave configuration of the inferior eyelid (when viewed from a frontal position), the locus of possible positions of a contact lens in contact with the inferior eyelid or limbal area, with respect to the wearer's pupil, is such that the desired area of coverage of the wearer's pupil by the near power area is maintained substantially constant, despite lateral or rotational dislocation. As will now be appreciated by those skilled in the art, the fitting of contact lens 10 to a patient involves a relatively simple procedure with minimal chair time, due to the concentric arrangement of near power and distant power areas, and particularly, a lower prism base, as well as a parallel or flattened posterior curve of the contact lens, which is generally easier to achieve than other configurations having tighter-fitting lenses.

According to another feature of the present invention, the relative size of the near power area to the wearer's pupil for concentric lenses having central near power portions, is important in achieving the desired "balance" between near and distant simultaneous vision. FIGS. 2 and 3 illustrate approximately the desired ratio of near power and distant power area coverage of the wearer's pupil 30. That is, when maintained in position according to the other aspects of the present invention, the central near power area 40 is lowered such that its upper edge lies below the upper edge of the wearer's pupil with a generally crescent-shaped portion, identified by the reference numeral 50, covered by the distant power area of the lens. According to one aspect of the present invention, the generally crescent-shaped portion 50 overlying the wearer's pupil comprises at least 10% of the area thereof. The crescent-shaped portion preferably ranges in size between 10% and 50%, and most preferably ranges in size between 10% and 25% of the area of the wearer's pupil, regardless of pupil size. Accordingly, not more than 90%, preferably between 50% and 90%, and most preferably between 75% and 90% of the wearer's pupil is covered by the near power portion of the lens. FIGS. 2 and 3 illustrate one proportion within the stated range, wherein approximately 85% of the wearer's pupil is covered by the near area power 40 and the remaining approximate 15% is covered by the distant power area 44. As illustrated in FIG. 3, this desired ratio between near power and distant power vision is maintained, even though the contact lens moves about the wearer's eye, principally because the lower edge of the contact lens is maintained in contact with the wearer's inferior eyelid or limbal area and the above-described orientation of the lens (and especially the lens optical correction portion) is substantially continuously maintained with respect to the pupil.

Figure 4:
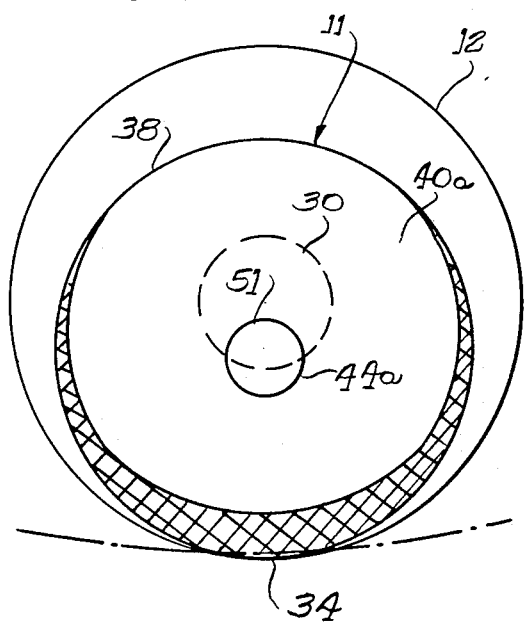
FIG. 4 is a schematic view illustrating the recommended fitting of an alternative embodiment of a contact lens according to the present invention.

Referring now to FIG. 4, the present invention is also directed to a "non-reversed" contact lens 11 having a central, concentric distant portion 44a surrounded by an outer annular near-correction portion 40a. Except for the relative size of the inner and outer portions, all other features are as explained above with respect to the central, near-correction lens. When a non-reversed contact lens is constructed according to the principles of the present invention, the central distant portion 44a is preferably made much smaller than that illustrated for the "reversed", central near-correction lens described above with reference to FIGS. 1–3 and the above-stated ratios of distant and near power correction areas are used. In particular, no more than 90%, preferably between 50% and 90%, and most preferably between 75% and 90% of the wearer's pupil is covered by the near power correction portion of the lens. The remaining at least 10%, preferably between 10% and 50% and most preferably between approximately 10% and 25% of the wearer's pupil is covered by the distant power correction portion of the lens. Accordingly, the central distant power portion is made to have a considerably reduced diameter such that when the lens is maintained in its low-riding orientation, so that an ovoid or generally football-shaped portion 51 is formed where the distant power center of the lens overlies the minor portion at least 10%, preferably between 10% and 50%, and most preferably between approximately between 10% and 25% of the wearer's pupil. By adjusting the size of the outer, annular lens portion, the central distant optical portion, sized smaller than the patient's pupil, can be either concentric or off-center with respect to the patient's pupil. In any event, a "non-reversed" contact lens constructed according to principles of the present invention offers manufacturing advantages in that the cross-sectional shape of the distant power central portion is easier to machine due to the configuration that the anterior surface of the distant power portion must have to provide the desired optical correction.

It can therefore be seen that a contact lens having improved features has been provided for bifocal simultaneous vision correction. A first embodiment of the contact lens, in some of its more prominent aspects, includes a central near power area concentrically arranged with an outer annular distant power area, but oriented so as to be off-centered with respect to the wearer's pupil. The near power area can have a size substantially larger than, equal to, or less than the size of the wearer's pupil. Other features of the lens include a prism ballast, continuous circular peripheral edge and low-riding fit which maintains contact with the wearer's inferior eyelid or limbus. Another important feature of the lens is that the central near power segment of the lens covers between 75% and 90% of the wearer's near point pupil size, with the remaining 10% to 25% comprising a crescent-shaped pupil portion covered by the distant power segment.

A second embodiment of a contact lens constructed according to principles of the present invention also provides simultaneous vision correction. In some of its more prominent aspects, the second embodiment includes a central distant power area concentrically arranged with an outer annular near power area, but oriented so as to be off-center with respect to the wearer's pupil. The central distant power area preferably has a size substantially smaller than the size of the wearer's pupil and, owing to the prism ballast and low-riding fit as well as the continuous circular periphery edge of the lens maintaining contact with either the wearer's inferior eyelid or limbus, an ovoid or football-shaped portion of the central distant portion of the lens covers between 10% and 25% of the wearer's near-point pupil size. With proper orientation of the lens, with respect to a wearer's pupil, the lens optical portions can have vertically any size, larger, smaller or equal to the wearer's pupil size.

Referring to FIGS. 5 and 6, a third embodiment of the present invention is illustrated with reference to a contact lens generally indicated at 70. The contact lens 70 is, in several respects, similar to the contact lens 10 of the previous Figures. For example, lens 70 has a relatively flat posterior surface 72, a steeper, outer annular interior surface 74 and a concentric central portion 76 having the steepest curve of lens 70. The central lens portion 76, in the manner similar to lens 12, can have either distance or near power correction, with the concentric outer annular portion 74 having a distance or near power correction, respectively. It is preferred that lens 70 have a prism ballast portion 80, which is shown crosshatched in FIG. 6 for illustrative purposes. However, if the prism ballast portion 80 is omitted, the anterior surface of lens 70 will follow the phantom line 84 of FIG. 5. However, with or without prism ballast portion 80, the outer periphery 86 of lens 70 is preferably continuously circular and is not truncated.

One feature distinguishing lens 70 from the aforedescribed lens 10 is an intermediate annular portion 90 preferably arranged concentric with outer portion 74 and central portion 76. Intermediate lens portion 90 has an anterior curvature intermediate the curvatures of outer portion 74 and central portion 76 so as to provide vision correction intermediate the vision corrections of those portions. A small peripheral curve or fitting portion (not illustrated) is provided at the outer edge of the lens outer portion 74. Lens 70 comprises a simultaneous vision lens with the central portion 76, intermediate portion 90 and outer portion 74 each focusing their own respective images in the wearer's eye. One application for lens 70 is to provide optical correction similar to that of trifocal eyeglasses. For example, central portion 76, as illustrated in FIG. 5, has an anterior curvature providing near power correction and the outer annular portion 74 providing distant power correction. The intermediate annular portion 90 would then be configured to provide focusing at an intermediate focal-length distance or any other intermediate distance that the wearer might require. The central near portion 76 covers no more than 90%, preferably between 50% and 90% and most preferably, between 75% and 90% of the wearer's pupil 94. The remaining portion of the wearer's pupil is divided between the intermediate portion 90 and the outer portion 70, with the intermediate portion 90 covering between 40% and 50% of the remaining pupil portion. In order to maintain these ratios of specified pupil coverage, lens 70 preferably incorporates the prism ballast 80 so that the lens is oriented downwardly, offset from a centered position about the wearer's pupil, as explained above with reference to the lenses 10 and 11 of FIGS. 1-4. The lens may also incorporate an outer fitting portion as will be explained below, to maintain the desired orientation of the lens optical portions to the wearer's pupil.

As mentioned above, the central portion 76 of lens 70 can provide distant power correction with the outer annular portion 74 providing intermediate power correction. The abovementioned ratios of pupil coverage among the three optical correction portions are preferably maintained. Thus, with distant portion 76 covering at least 10%, preferably between 10 and 50%, and most preferably between 10% and 25% of the wearer's pupil, the diameter of the "non-reversed" central portion 76 would be considerably smaller than the central portion of a "reversed" central near-portion lens. Again, as in the central near-portion lens, a central distant power lens 70 has an intermediate portion 90 dividing the remaining, uncovered portion of the wearer's pupil with the outer annular portion 74. As in the lens aforedescribed, intermediate portion 90 covers between 40% and 50% of the remaining portion of the wearer's pupil in order to maintain the defined ratios of pupil coverage among the three lens portions 76, 90 and 74.

The central distance ("non-reversed") lens preferably has a ballast portion 80, the lower edge of which contacts either the wearer's inferior eyelid, limbus or juncture between the limbus and cornea, to continuously orient the lens at a position lowered from a centered position about the wearer's pupil. However, if desired, the triple focal portion lens 70, whether central near or central distant type, can follow other fitting practices better known today. For example, lens 70 can have a posterior curvature suitable for attachment to the wearer's cornea, so as to maintain the lens 70 centered about the wearer's pupil. The preferred ranges of central, outer annular and intermediate annular portions can be sized accordingly for concentric orientation about the wearer's pupil. Since the three portions or elements of lens 70 are concentric, the lens need not be stopped from rotating about the wearer's pupil. The three-portion lens 70 enjoys many of the advantages of economical fabrication as does the two-element lens 10 of FIGS. 1-4 and, even if the off-centered prism ballast fitting technique described herein is not followed, fitting of the lens to a patient requires relatively little chair time and is further economical in this respect.

Among the various features according to the present invention, two general types of lenses have been described. One type of lens, the bifocal lens, has a central vision correction portion and an outer, annular vision correction portion. The second type of lens, the triple focal portion lens, has central intermediate annular and outer annular vision correction portions. As mentioned above, preferably each of these types of lenses have the same size, that is, their outer peripheries are circular and have approximately the same diameter, larger than the wearer's pupil, but smaller than the wearer's cornea. A non-truncated prism ballast portion is provided to maintain the desired orientation between the lens portions and the wearer's pupil. According to other aspects of the present invention, orientation of the optical portions of the lens with respect to the wearer's pupil can be provided with multifocal concentric, simultaneous vision lenses of increased size, generally large enough to cover the substantial entirety of the surface of the cornea of the wearer's eye. Lenses of this latter type according to the present invention are preferably made from any of the gas-permeable contact lens materials available today to avoid edema or other physiological complications, especially during extended wearing periods. The posterior curve of the enlarged lens preferably corresponds to the curvature of the wearer's cornea, and the anterior curvature is chosen to provide either bifocal or trifocal vision correction, as explained above. A lens fitting portion, annular in configuration, and preferably non-corrective, is added outside of the outer, vision-correcting annular portions described above. Since the fitting lies outside the wearer's range of vision, the fitting portion is preferably provided as an outermost annular portion of any conveniently formed curvature, and usually does not follow the curvature of the adjacent outermost optical corrective portion of the lens. The fitting portion, as with the vision correction portions described above, is preferably formed in a unitary, generally homogeneous lens body which is cut, ground or otherwise formed to have the features described above. However, due to the larger outer periphery of the lens and the close positioning of its periphery to the limbal area of the eye, a prism ballast portion is generally not required to orient the optical corrective portions of the lens to the wearer's pupil.

Referring now to FIG. 7, a multifocal concentric, simultaneous vision contact lens 100 is shown fitted to the pupil 102 and cornea 104 of a wearer's eye. Contact lens 100, as illustrated, is of the bifocal type having a central near portion 106 and an outer annular, distance-correcting portion 108. Surrounding the outer optical correction portion 108 is a fitting portion 110, having a generally circular outer edge (i.e., periphery) 112 corresponding generally to the diameter of the wearer's cornea and preferably about 1 mm smaller than the wearer's corneal diameter. As before, it is generally preferred that a central near portion 106 covers no more than 90%, preferably between 50% and 90%, and most preferably between 75% and 90% of the wearer's pupil 102. The outer distant correction portion 108 covers the remaining portion of the wearer's pupil and is preferably oversized relative to the size of the wearer's pupil for ease of manufacturing. The relative sizes of the outer annular portion 108 and fitting portion 110 can be varied, as desired, particularly since the interface between the fitting portion 110 and outer optical correction portion 108 lies outside of the patient's pupil. Engagement of the outer periphery 112 of lens 100 with the wearer's eye surrounding the cornea, maintains the desired orientation of the optical portions of lens 100 with the wearer's pupil. In FIG. 7, a reversed bifocal lens is illustrated. However, the contact lens 100 can be constructed to have a "non-reversed" bifocal optical correction portion or a trifocal correction portion, preferably constructed according to the principles set forth above with respect to the lenses of FIGS. 1–6. The ease of fabrication of lens 100, particularly if designed to provided trifocal correction, can now be appreciated, and is particularly advantageous in providing the stability of orientation needed to maintain the desired ratios and percentages of pupil coverage as set forth above, with respect to the preceding Figures.

As will now be appreciated, two examples of means for orienting the optical portions of a contact lens relative to the pupil of the wearer's eye have been shown. Both the prism ballast and fitting portion orienting means may be utilized to provide any desired orientation but are preferably relied upon to maintain a desired relative intensity of visual response in the images simultaneously formed in the wearer's eye by the several optical portions of the lens. Preferred ranges of pupil coverage set forth above, as will be appreciated by those skilled in the art, in effect control the relative intensity of visual response in the images formed by the lens optical portions, since light incident on the eye and simultaneously viewed by the wearer is divided by the different optical portions of the lens. Thus, in its several aspects, the present invention provides to a contact lens practitioner a heretofore unrealized degree of control in balancing any involuntary preference in the wearer for concentrating on distant objects, a feature especially useful in treating patients suffering from presbyopia. Of course, those skilled in the art will readily appreciate that several aspects of the present invention may be utilized to provide a highly-controlled correction for other maladies presently treated by contact lens practitioners, and provides an opportunity for successfully treating other maladies which heretofore required eyeglasses, or in more severe instances, surgical procedures in the eye itself.

It will thus be seen that the objects hereinbefore set forth may readily and efficiently be attained and, since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A multifocal contact lens comprising a lens body having an outer optical portion and an inner, concentric optical portion, said inner and said outer optical portions having different optical corrections, one for imaging near objects and the other for imaging distant objects, simultaneously, said lens body further having a generally circular peripheral edge and lowering means for lowering the position of the lens with respect to the wearer'pupil so that the peripheral edge of the lens contacts the wearer'eye adjacent the limbal area thereof for orienting said lens body at a position downwardly shifted from a position centered about the pupil of the wearer's eye so that the inner optical portion of the lens overlays an ovoid portion of the wearer's pupil, with no more than 90% of the pupil of the wearer's eye being overlain by the optical portion having optical correction for imaging near objects.

2. The lens of claim 1 wherein said orienting means comprises a prism ballast for contacting one of said lower eyelid and limbal area of the wearer.

3. The lens of claim 1 wherein the inner concentric portion has a size substantially larger than the size of the wearer's pupil and has a corrective optical prescription for imaging near objects.

4. The lens of claim 3 wherein said inner and said outer lens portions have corrective optical prescriptions for imaging near and distant objects, respectively and said inner lens portion is sized so that, with said lens body in said downwardly shifted position, no more than 90% of the pupil of the wearer's eye is overlain thereby, with the remainder of the pupil of the wearer's eye comprising a crescent-shaped portion overlain by said outer lens portion.

5. The lens of claim 1 wherein between 50% and 90% of the wearer's eye is overlain by the optical portion having optical correction for imaging near objects.

6. The lens of claim 4 wherein between 75% and 90% of the wearer's eye is overlain by the optical portion having optical correction for imaging near objects.

7. The lens of claim 2 wherein the inner concentric portion has a size substantially smaller than the size of the wearer's pupil and has a corrective optical prescription for imaging distant objects.

8. The lens of claim 7 wherein said inner and said outer lens portions have corrective optical prescriptions for imaging distant and near objects respectively, and said inner distant portion is sized so that with said lens body in said downwardly-shifted position only a portion of the pupil of the wearer's eye not less than approximately 10% is overlain thereby with an ovoid portion of the inner lens portion.

9. The lens of claim 8 wherein between 50% and 10% of the wearer's pupil is overlain with an ovoid portion of the inner lens portion.

10. The lens of claim 8 wherein between 25% and 10% of the wearer's pupil is overlain with an ovoid portion of the inner lens portion.

11. The lens of claim 1 further comprising an annular intermediate portion between said outer and said inner portions and having a third optical correction intermediate that of said inner and said outer portions so that images from said outer, said intermediate and said inner lens portions are simultaneously formed in the wearer's eye.

12. The lens of claim 1 wherein said orienting means comprises an annular fitting portion surrounding said lens outer portion and having a diameter generally corresponding to the diameter of the wearer's cornea so as to contact portions of the wearer's eye surrounding the wearer's cornea to maintain the orientation of said inner and said outer optical portions of said lens with respect to the wearer's pupil.

13. A trifocal contact lens comprising a lens body having an outer portion with a first optical correction, and a generally circular peripheral edge, an inner central optical portion having a second, different optical correction, an intermediate optical portion having a third optical correction intermediate that of said first and said second portions, so that images from said outer, said intermediate and said central lens portion are simultaneously formed in the wearer's eye, and lowering means for lowering the position of the lens with respect to the wearer's pupil so that the peripheral edge of the lens contacts the wearer's eye adjacent the limbal area thereof for orienting said lens body at a position downwardly shifted from a position centered about the wearer's pupil so that the inner optical portion of the lens overlays an ovoid portion of the wearer's pupil.

14. The lens of claim 13 wherein said lowering means comprises a prism ballast for contacting one of said lower eyelid and limbal area of the wearer to orient said lens body in a preselected relation to the pupil of the wearer's eye.

15. The lens of claim 14 wherein said prism ballast maintains said lens body at a position downwardly shifted from a position centered about the pupil of the wearer's eye.

16. The lens of claim 15 wherein the inner concentric portion has a size substantially larger than the size of the wearer's pupil and has a corrective optical prescription for imaging near objects.

17. The lens of claim 13 wherein said inner and said outer lens portions have corrective optical prescriptions for imaging near and distant objects, and no more than 90% of the pupil of the wearer's eye is overlain by the optical portion having optical correction for imaging near objects.

18. The lens of claim 17 wherein between 50% and 90% of the wearer's eye is overlain by the optical portion having optical correction for imaging near objects.

19. The lens of claim 17 wherein between 75% and 90% of the wearer's eye is overlain by the optical portion having optical correction for imaging near objects.

20. The lens of claim 15 wherein the inner concentric portion has a size substantially larger than the size of the wearer's pupil and has a corrective optical prescription for imaging near objects, with a crescent-shaped portion of the wearer's pupil overlain by said outer and said intermediate optical portions.

21. The lens of claim 20 wherein said inner and said outer lens portions have corrective optical prescriptions for imaging distant and near objects respectively, and said inner distant portion is sized so that with said lens body in said downwardly-shifted position only a portion of the pupil of the wearer's eye not less than approximately 10% is overlain thereby with an ovoid portion of the inner lens portion.

22. The lens of claim 13 wherein said lens body is formed of generally homogeneous material throughout, with one of said central and said outer portions having a steeper anterior curved surface and said intermediate portion having a curvature of intermediate steepness so as to provide an intermediate optical correction.

23. The lens of claim 13 further comprising a fitting portion surrounding said lens outer and having a diameter generally corresponding to the diameter of the wearer's cornea so as to engage portions of the wearer's eye adjacent the wearer's cornea to maintain the orientation of said outer, said intermediate and said central optical portions with respect to the pupil of the wearer's eye so that images from each optical portion are simultaneously formed in the wearer's eye.

* * * * *